US008225815B2

(12) United States Patent
Valtr et al.

(10) Patent No.: US 8,225,815 B2
(45) Date of Patent: Jul. 24, 2012

(54) FLUID FLOW REGULATOR

(75) Inventors: Kelly Dale Valtr, Roanoke, TX (US); Douglas Alexander Scott, Flowood, MS (US)

(73) Assignee: Eaton Corporation, Cleveland, OH (US)

( * ) Notice: Subject to any disclaimer, the term of this patent is extended or adjusted under 35 U.S.C. 154(b) by 447 days.

(21) Appl. No.: 12/468,530

(22) Filed: May 19, 2009

(65) Prior Publication Data
US 2010/0294381 A1 Nov. 25, 2010

(51) Int. Cl.
*F16K 31/12* (2006.01)
(52) U.S. Cl. ....................................... 137/504
(58) Field of Classification Search .............. 137/504
See application file for complete search history.

(56) References Cited

U.S. PATENT DOCUMENTS

| | | | |
|---|---|---|---|
| 2,343,375 A | 3/1944 | Herman | |
| 3,339,580 A | 9/1967 | Cutter et al. | |
| 3,339,589 A | 9/1967 | Götz et al. | |
| 3,561,574 A * | 2/1971 | Dickinson et al. | 188/280 |
| 3,872,884 A | 3/1975 | Busdiecker et al. | |
| 3,921,390 A | 11/1975 | Stoltman | |
| 4,197,874 A | 4/1980 | Neff | |
| 4,254,687 A | 3/1981 | Alexander | |
| 4,278,010 A | 7/1981 | Wallischeck et al. | |
| 4,336,903 A | 6/1982 | Zirps | |
| 4,440,191 A | 4/1984 | Hansen | |
| 4,449,548 A | 5/1984 | Tutherly | |
| 4,715,395 A | 12/1987 | Mainelli et al. | |
| 4,850,390 A * | 7/1989 | Francois | 137/501 |
| 5,020,774 A | 6/1991 | Christianson | |
| 5,156,332 A | 10/1992 | Dyer | |
| 5,190,075 A | 3/1993 | Tentler et al. | |
| 5,639,066 A * | 6/1997 | Lambert et al. | 251/282 |
| 5,687,452 A | 11/1997 | Hamatani et al. | |
| 6,032,667 A | 3/2000 | Heinonen | |
| 6,173,737 B1 * | 1/2001 | Saucier | 137/504 |
| 7,013,913 B2 | 3/2006 | Kuromusha et al. | |
| 7,114,518 B2 | 10/2006 | Kirby | |
| 7,144,069 B2 * | 12/2006 | Meyer et al. | 296/156 |
| 7,156,120 B2 * | 1/2007 | Cherfane et al. | 137/504 |
| 7,401,751 B2 | 7/2008 | Holder | |
| 2009/0032117 A1 | 2/2009 | Kuromusha | |

FOREIGN PATENT DOCUMENTS

| | | |
|---|---|---|
| EP | 0 133 623 A1 | 3/1985 |
| EP | 1 647 748 A1 | 4/2006 |
| FR | 2 537 693 A1 | 6/1984 |

* cited by examiner

*Primary Examiner* — John Rivell
*Assistant Examiner* — Ian Paquette
(74) *Attorney, Agent, or Firm* — Merchant & Gould, P.C.

(57) ABSTRACT

A fluid flow regulator includes a valve assembly defining a fluid passage. The fluid passage includes a first port, a second port, a sensing orifice disposed between the first and second ports, a first orifice disposed between the first port and the sensing orifice and a second orifice disposed between the sensing orifice and the second port. A first flow area of the first flow orifice varies in response to differential pressure across the sensing orifice as fluid flows through the fluid passage in a first direction from the first port to the second port. The first flow area is fixed as fluid flows through the fluid passage in an opposite second direction. A second flow area of the second orifice is fixed as fluid flows through the fluid passage in the first direction and varies as fluid flows through the fluid passage in the second direction.

15 Claims, 6 Drawing Sheets

FLUID FLOW REGULATOR

BACKGROUND

Conventional flow regulators are used to control the rate at which fluid is routed to a fluid device. However, as the temperature of the fluid flowing through the conventional flow regulator decreases, the accuracy of the conventional flow regulator decreases. Therefore, there exists a need for a flow regulator that is capable of operating at low fluid temperatures.

SUMMARY

An aspect of the present disclosure relates to a fluid flow regulator. The fluid flow regulator includes a valve assembly defining a fluid passage. The fluid passage includes a first port, a second port, a sensing orifice disposed in the fluid passage between the first and second ports, a first orifice disposed in the fluid passage between the first port and the sensing orifice and a second orifice disposed in the fluid passage between the sensing orifice and the second port. A first flow area of the first flow orifice varies in response to differential pressure across the sensing orifice as fluid flows through the fluid passage in a first direction from the first port to the second port. The first flow area is fixed as fluid flows through the fluid passage in a second direction from the second port to the first port. A second flow area of the second orifice is fixed as fluid flows through the fluid passage in the first direction and varies as fluid flows through the fluid passage in the second direction.

Another aspect of the present disclosure relates to a fluid flow regulator. The fluid flow regulator includes a sleeve and a spool. The sleeve defines a bore and further defines a fluid inlet and a fluid outlet disposed downstream of the fluid inlet. The fluid inlet and the fluid outlet are in fluid communication with the bore. The spool is disposed in the bore of the sleeve. The spool defines a sensing orifice disposed downstream of the fluid inlet. The spool and the sleeve cooperatively define a variable orifice disposed upstream of the sensing orifice and downstream of the fluid inlet. A flow area of the variable orifice decreases as differential fluid pressure across the sensing orifice increases beyond a limit. The valve assembly is adapted to allow fluid to flow in a first direction and an opposite second direction.

Another aspect of the present disclosure relates to a snubber assembly. The snubber assembly includes an actuator assembly and a fluid flow regulator in fluid communication with the actuator assembly. The actuator assembly includes a housing defining a bore. A piston assembly is disposed in the bore. The piston assembly and the bore cooperatively define a first chamber of the bore and a second chamber of the bore. The fluid flow regulator defines a fluid passage. The fluid passage includes a fluid inlet, a fluid outlet disposed downstream of the fluid inlet, a sensing orifice disposed in the fluid passage between the fluid inlet and the fluid outlet, and a variable orifice disposed upstream of the sensing orifice in the fluid passage. A differential fluid pressure across the sensing orifice affects a flow area of the variable orifice. The fluid flow regulator is adapted to provide bidirectional fluid flow through the fluid passage.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
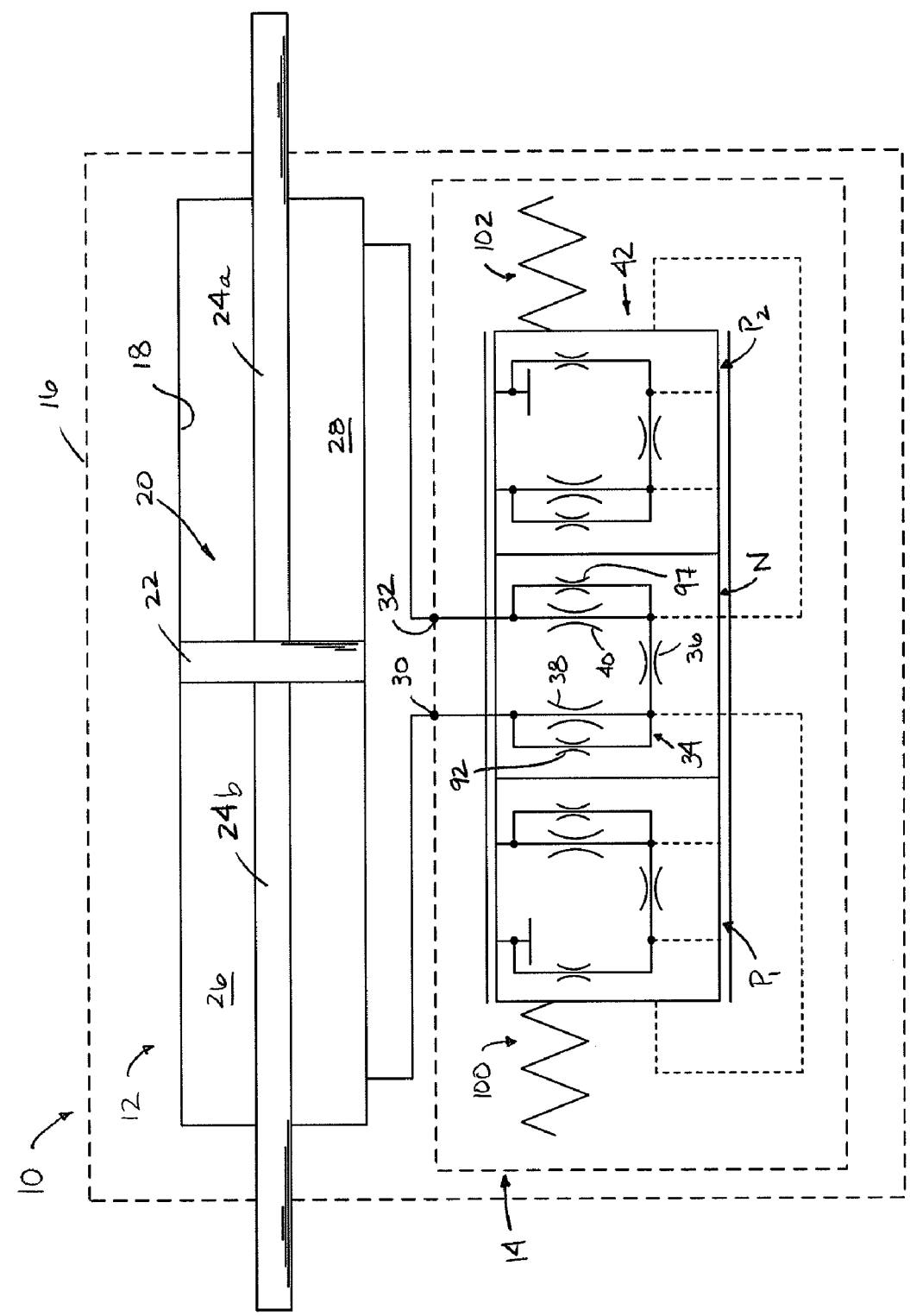
FIG. 1 is a schematic representation of an actuator assembly having exemplary features of aspects in accordance with the principles of the present disclosure.
Figure 2:
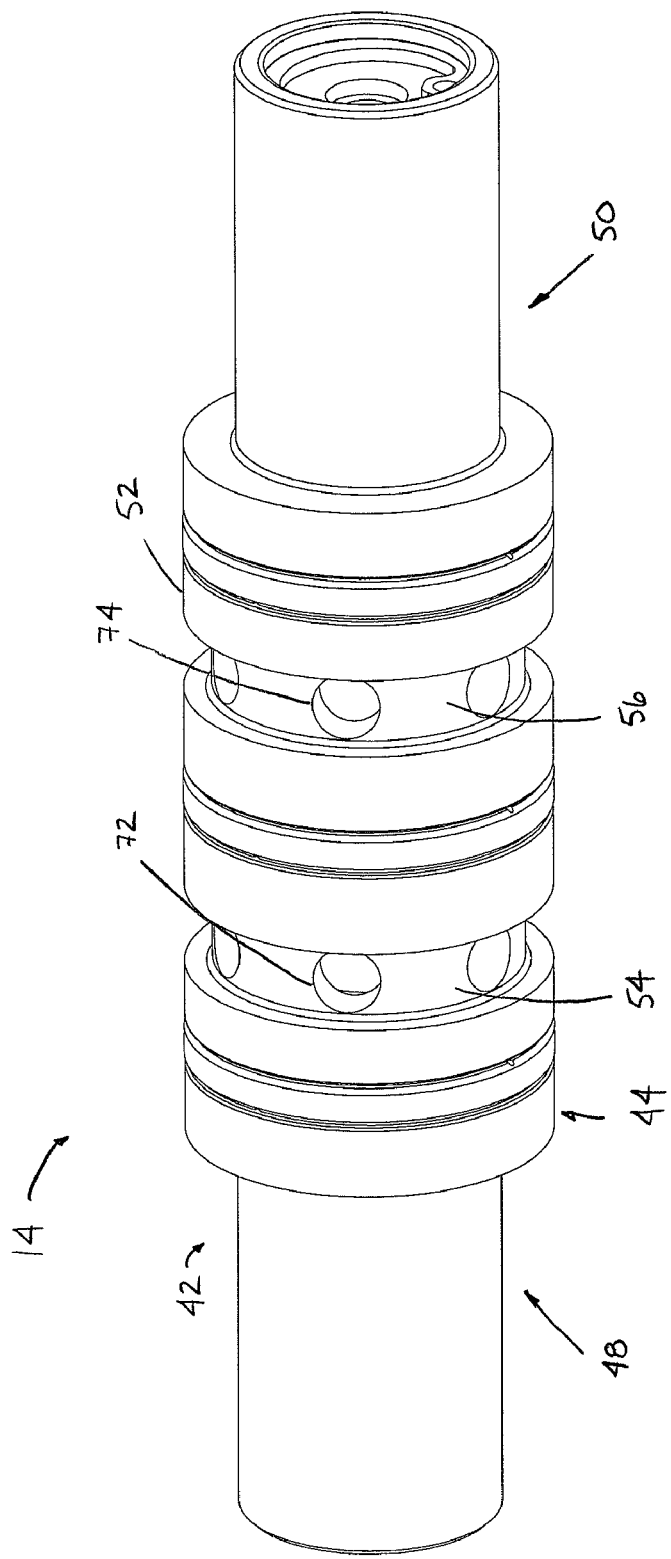
FIG. 2 is perspective view of a fluid flow regulator suitable for use in the actuator assembly of FIG. 1.

Referring now to FIG. 1, an actuator system, generally designated 10, is shown. The actuator system 10 includes an actuator assembly, generally designated 12, and a fluid flow regulator, generally designated 14.

In one aspect of the present disclosure, the actuator assembly 12 is a double-acting cylinder. While the actuator assembly 12 is shown in FIG. 1 as being a cylinder, it will be understood that the scope of the present disclosure is not limited to the actuator assembly 12 being a cylinder as the actuator assembly 12 could be a motor, such as a linear motor or a rotary motor, etc.

In one aspect of the present disclosure, the actuator assembly 12 includes a housing 16 defining a bore 18. The actuator assembly 12 further includes a piston assembly 20 slidably disposed in the bore 18. The piston assembly 20 includes a piston 22, a first piston rod 24a that is attached to a first end of the piston 22 and a second piston rod 24b that is attached to an opposite second end of the piston 22. The piston rods 24a, 24b extend from the housing 16. The piston 22 separates the bore 18 into a first chamber 26 and a second chamber 28.

In one aspect of the present disclosure, the piston assembly 20 is actuated between a first position, in which the first piston rod 24a is fully retracted and the second piston rod 24b is fully extended, and a second position, in which the first piston rod 24a is fully extended and the second piston rod 24b is fully retracted. As the first piston rod 24a is extended toward the second position, fluid enters the first chamber 26 of the bore 18 and is expelled from the second chamber 28. As the piston rod 24 is retracted toward the first position, fluid enters the second chamber 28 of the bore 18 and is expelled from the first chamber 26. In one aspect of the present disclosure, the first and second piston rods 24a, 24b are manually actuated between the first and second positions by pulling or pushing on at least one of the first and second piston rods 24a, 24b.

The fluid flow regulator 14 is in fluid communication with the actuator assembly 12. In the depicted schematic of FIG. 1, the fluid flow regulator 14 is disposed in the housing 16 of the actuator assembly 12. In one aspect of the present disclosure, the fluid flow regulator 14 could alternatively be disposed in a separate housing and be in fluid communication with the actuator assembly 12 through fluid lines (e.g., hose, tubing, etc.).

The fluid flow regulator 14 includes a first port 30 and a second port 32. The first port 30 is in fluid communication with the first chamber 26 of the bore 18 while the second port 32 is in fluid communication with the second chamber 28.

The fluid flow regulator 14 defines a fluid passage 34 between the first and second ports 30, 32. In one aspect of the present disclosure, the fluid flow regulator 14 is adapted to control the flow rate of fluid through the fluid passage 34 between the first and second ports 30, 32. In one aspect of the present disclosure, the fluid is a hydraulic fluid (e.g., MIL-83282, MIL-5606, fluids sold under product name ROYCO®, etc.)

The fluid flow regulator 14 is configured to provide a "meter-in" arrangement. In one aspect of the present disclosure, the "meter-in" arrangement of the fluid flow regulator 14 is adapted to minimize the effects of low fluid temperature on the control of fluid through the fluid flow regulator 14.

The "meter-in" arrangement of the fluid flow regulator 14 includes a variable orifice disposed upstream from a sensing orifice 36 positioned in the fluid passage 34 between an inlet and an outlet of the fluid flow regulator 14. In one aspect of the present disclosure, the variable orifice is disposed between the inlet and the sensing orifice 36 of the fluid flow regulator 14. The variable orifice of the fluid flow regulator 14 is adapted to vary the volume of fluid that enters the fluid flow regulator 14 from the actuator assembly 12 in response to a differential pressure ΔP across the sensing orifice 36 of the fluid flow regulator 14. With the variable orifice disposed upstream of the sensing orifice 36 of the fluid flow regulator 14, the average pressure of the fluid passing through the sensing orifice 36 of the fluid flow regulator 14 is lower than the pressure at the inlet due to the pressure drop across the variable orifice. As will be described in greater detail subsequently, this lower average pressure of fluid through the sensing orifice 36 allows the fluid flow regulator 14 to provide a more accurate output at lower fluid temperatures than conventional flow regulators.

The fluid flow regulator 14 includes a first orifice 38 disposed between the sensing orifice 36 and the first port 30 and a second orifice 40 disposed between the sensing orifice 36 and the second port 32. In one aspect of the present disclosure, the first and second orifices 38, 40 are configured to meter fluid into the fluid passage 34. This "meter-in" arrangement is adapted to adjust or vary the volume of fluid that enters the fluid passage 34 from the actuator assembly 12 in response to a differential pressure across the sensing orifice 36.

In one aspect of the present disclosure, the fluid flow regulator 14 is bidirectional. A bidirectional fluid flow regulator 14 allows fluid to flow in a first direction (i.e., from the first port 30 to the second port 32) through the fluid flow regulator 14 and a second direction (i.e., from the second port 32 to the first port 30) through the fluid flow regulator 14. As fluid flows in the first direction, the first orifice 38 acts as a pressure-compensated variable orifice while the second orifice 40 acts as a fixed orifice. As fluid flows in the second direction, the second orifice 40 acts as a pressure-compensated variable orifice while the first orifice 38 acts as a fixed orifice.

As fluid flows in the first direction, a first flow area of the first orifice 38 changes in response to changes in the differential pressure across the sensing orifice 36. As the first flow area of the first orifice 38 varies in response to the differential pressure of the fluid across the sensing orifice 36, the first orifice 38 is adapted to meter the volume of fluid that passes through the first orifice 38 to the sensing orifice 36 in the first direction.

As fluid flows in the first direction, a second flow area of the second orifice 40 is at a size that remains generally unchanged regardless of changes in the differential pressure of the fluid across the sensing orifice 36. Therefore, as fluid flows from the first port 30 to the second port 32, the first orifice 38 is adapted to meter the volume of fluid passing to the sensing orifice 36 while the second orifice 40 is adapted to permit fluid to flow through without adjusting the flow area of the second orifice 40.

As fluid flows in the second direction, the second flow area of the second orifice 40 is adapted to meter the volume of fluid that passes through the second orifice 40 to the sensing orifice 36 in response to changes in the differential pressure across the sensing orifice 36. The first orifice 38 is adapted to permit fluid to flow through without adjusting the first flow area of the first orifice 38.

Referring now to FIG. 1-4, an example of a fluid flow regulator 14 is shown. The fluid flow regulator 14 includes a valve assembly 42. The valve assembly 42 is adapted to move between a neutral position N, a first position $P_1$, and a second position $P_2$. In one aspect of the present disclosure, the valve assembly 42 includes a sleeve 44 and a spool 46 (best shown in FIG. 5).

The sleeve 44 is generally cylindrical in shape and includes a first axial end portion 48 and an oppositely disposed second axial end portion 50. The sleeve 44 further includes an outer surface 52 that defines a first control groove 54 disposed between the first and second axial end portions 48, 50 and a second control groove 56 disposed between the first control groove 54 and the second axial end portion 50. The first control groove 54 is adapted for fluid communication with the first port 30 (shown schematically in FIG. 1) while the second control groove 56 is adapted for fluid communication with the second port 32 (shown schematically in FIG. 1).

The sleeve 44 defines a bore 60 that extends through the first and second axial end portions 48, 50. The bore 60 includes a central longitudinal axis 62. The sleeve 44 defines a first annular groove 64 disposed in the bore 60 between the first and second axial end portions 48, 50 and a second annular groove 66 disposed in the bore 60 between the first annular groove 64 and the second axial end portion 50. The first annular groove 64 includes a first opening 68 in the bore 60 while the second annular groove 66 includes a second opening 70 in the bore 60. The first and second openings 68, 70 of the first and second annular grooves 64, 66 are axially offset in the bore 60 such that a land 71 is disposed between the first and second openings 68, 70. The land 71 defines an inner diameter that is less than an inner diameter of the first and second annular grooves 64, 66.

The sleeve 44 further defines a first plurality of control passages 72 and a second plurality of control passages 74. The first plurality of control passages 72 extends in a radial direction from the first control groove 54 to the first annular groove 64 in the bore 60 while the second plurality of control passages 74 extends in a radial direction from the second control groove 56 to the second annular groove 66 in the bore 60.

Figure 5:
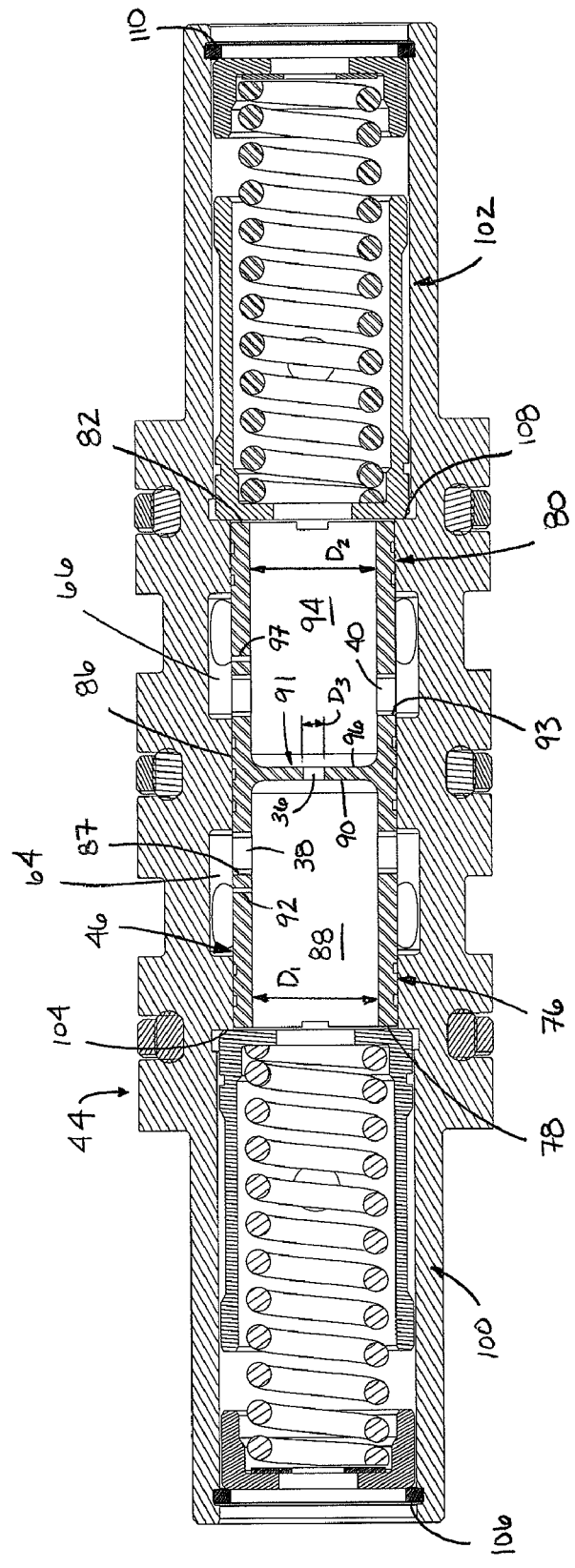
FIG. 5 is a cross-sectional view of the fluid flow regulator of FIG. 2.

Referring now to FIGS. 1 and 5, the spool 46 is slidably disposed in the bore 60 of the sleeve 44. The spool 46 includes a first end portion 76 having a first end 78 and a second end portion 80 having a second end 82. The second end 82 of the spool 46 is oppositely disposed from the first end 78. The spool 46 further includes an outer surface 86.

The first end portion 76 defines the first orifice 38 having an opening 87 at the outer surface 86. The first orifice 38 extends in a radial direction from the opening 87 at the outer surface 86 of the spool 46 to a first cavity 88 defined by the first end portion 76 of the spool 46. The first cavity 88 extends in an axial direction from the first end 78 of the spool 46 to a first surface 90 of an inner wall 91 and includes a first inner diameter $D_1$.

The first end portion 76 further defines a first bypass orifice 92. The first bypass orifice 92 extends in a radial direction from the outer surface 86 of the spool 46 to the first cavity 88. The first bypass orifice 92 is disposed adjacent to the first orifice 38 such that the first bypass orifice 92 is disposed in parallel with the first orifice 38. The first bypass orifice 92 defines an inner diameter that is less than the inner diameter of the first orifice 38. The first bypass orifice 92 is oriented on the spool 46 such that the first bypass orifice 92 is in fluid communication with the first annular groove 64 when the spool 46 is axially displaced in the sleeve 44 between the first and second position $P_1$, $P_2$. The first bypass orifice 92 is adapted to allow fluid to pass through the fluid flow regulator 14 in the event the first orifice 38 is inadvertently blocked.

The second end portion 80 defines the second orifice 40 having an opening 93 at the outer surface 86. The second orifice 40 extends in a radial direction from the opening 93 at the outer surface 86 of the spool 46 to a second cavity 94 defined by the second end portion 80 of the spool 46. The second cavity 94 extends in an axial direction from the second end 82 to a second surface 96 of the inner wall 91 and includes a second inner diameter $D_2$. In one aspect of the present disclosure, the first inner diameter $D_1$ of the first cavity 88 is about equal to the second inner diameter $D_2$ of the second cavity 94.

The second end portion 80 further defines a second bypass orifice 97. The second bypass orifice 97 extends in a radial direction from the outer surface 86 of the spool 46 to the second cavity 94. The second bypass orifice 97 is disposed adjacent to the second orifice 40 such that the second bypass orifice 97 is disposed in parallel with the second orifice 40. The second bypass orifice 97 defines an inner diameter that is less than the inner diameter of the second orifice 40. The second bypass orifice 97 is oriented on the spool 46 such that the second bypass orifice 97 is in fluid communication with the second annular groove 66 when the spool 46 is axially displaced in the sleeve 44 between the first and second position $P_1$, $P_2$. The second bypass orifice 97 is adapted to allow fluid to pass through the fluid flow regulator 14 in the event the second orifice 40 is inadvertently blocked.

The inner wall 91 of the spool 46 is disposed between the first and second cavities 88, 94. The inner wall 91 defines the sensing orifice 36. The sensing orifice 36 provides a fluid communication path between the first and second cavities 88, 94 of the spool 46. The sensing orifice 36 defines a third inner diameter $D_3$. The third inner diameter $D_3$ of the sensing orifice 36 is less than the first inner diameter $D_1$ of the first cavity 88 and the second inner diameter $D_2$ of the second cavity 94. In one aspect of the present disclosure, the third inner diameter $D_3$ of the sensing orifice 36 is less than an inner diameter of the first orifice 38 and an inner diameter of the second orifice 40.

Figure 3:
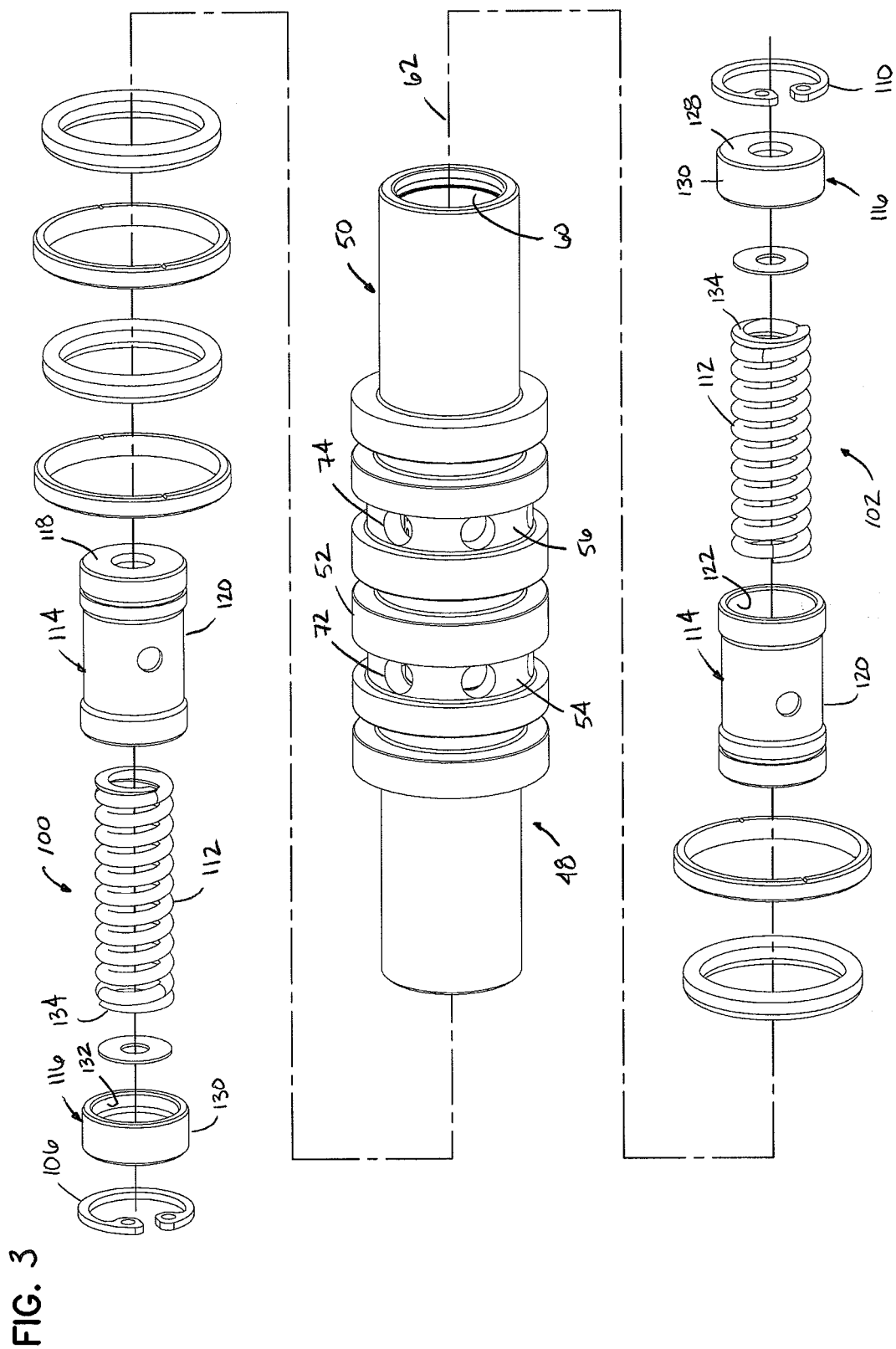
FIG. 3 is an exploded perspective view of the fluid flow regulator of FIG. 2.
Figure 4:
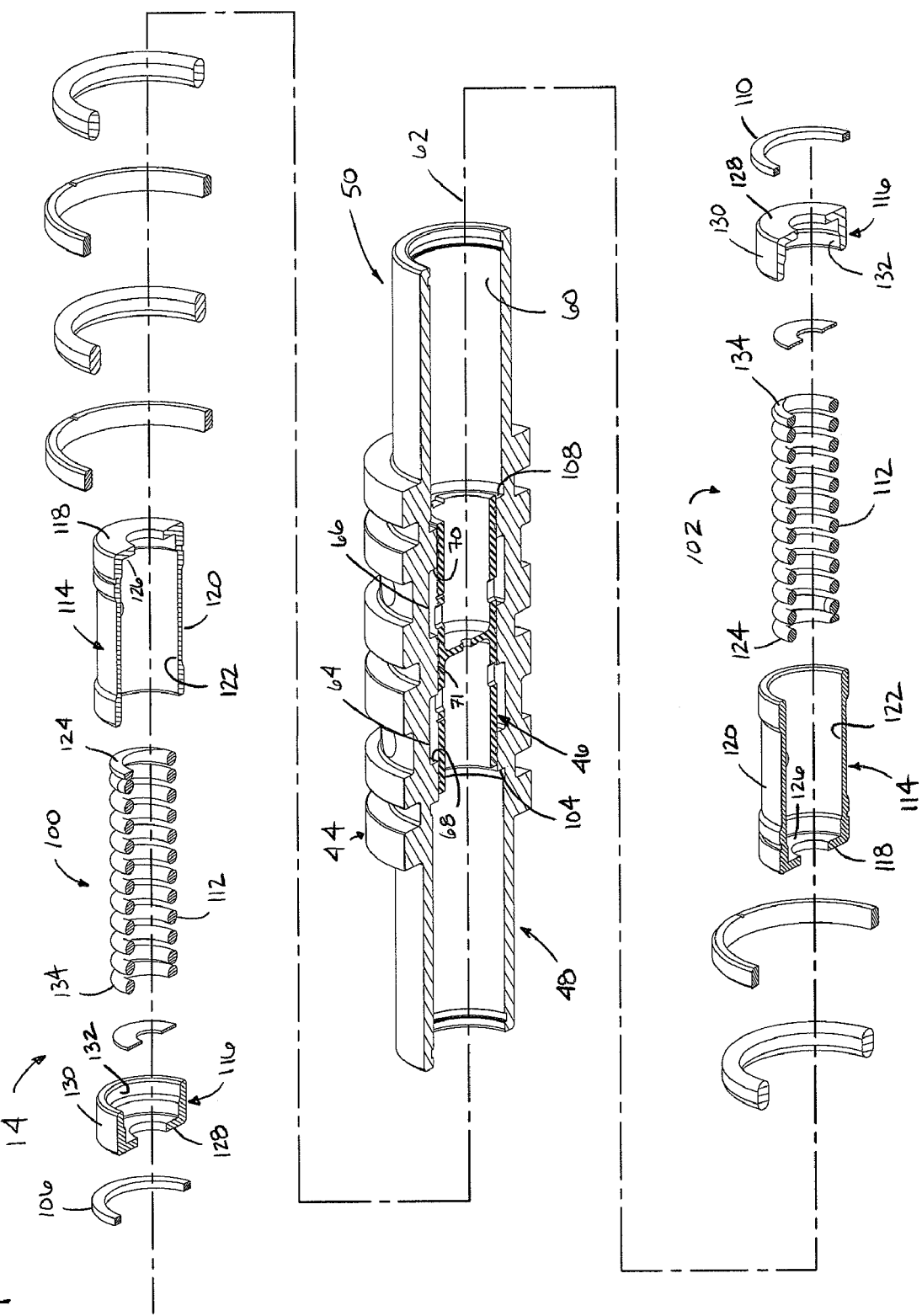
FIG. 4 is an exploded cross-sectional view of the fluid flow regulator of FIG. 3.

Referring now to FIGS. 3-5, the valve assembly 42 further includes a first spring assembly 100 and a second spring assembly 102 disposed in the bore 60 of the sleeve 44. The first and second spring assemblies 100, 102 are adapted to move the valve assembly 42 to the neutral position N (i.e., to center the spool 46 in the sleeve 44) when fluid is not passing through the fluid passage 34.

The first spring assembly 100 is disposed in the first axial end portion 48 of the bore 60 of the sleeve 44 between a first shoulder 104 in the bore 60 and a first retainer 106 engaged with the bore 60. The second spring assembly 102 is disposed in the second axial end portion 50 of the bore 60 of the sleeve 44 between a second shoulder 108 in the bore 60 and a second retainer 110 engaged with the bore 60.

Each of the first and second spring assemblies 100, 102 includes a spring 112, a spring guide 114 and a spring seat 116. The spring guide 114 is generally cylindrical in shape and includes a base wall 118 and a sidewall 120 that extends outwardly from the base wall 118. The base wall 118 and the sidewall 120 cooperatively define a spring cavity 122 that is adapted to receive at least a portion of the spring 112. A first axial end 124 of the spring 112 is disposed in the spring cavity 122 and abuts a first face 126 of the base wall 118 of the spring guide 114.

The spring seat 116 is generally cylindrical in shape and includes a seat 128 and a sidewall 130 that extends outwardly from the seat 128. The seat 128 and the sidewall 130 cooperatively define a spring cavity 132 that is adapted to receive at least a portion of the spring 112. A second axial end 134 of the spring 112 is disposed in the spring cavity 132 of the spring seat 116 and abuts the seat 128.

Referring now to FIGS. 1 and 3-5, the operation of the fluid flow regulator 14 will be described. As the piston assembly 20 retracts in the housing 16, fluid from the first chamber 26 of the bore 18 is communicated to the second chamber 28 of the bore 18 in the first direction through the fluid passage 34 of the fluid flow regulator 14.

Fluid enters the fluid flow regulator 14 through the first port 30. In this example, the first port 30 acts as a fluid inlet for the fluid flow regulator 14. The fluid is communicated into the first annular groove 64 of the sleeve 44 through the first plurality of control passages 72. The fluid then passes through the first orifice 38 of the spool 46 into the first cavity 88. The fluid is communicated through the sensing orifice 36 of the inner wall 91 to the second cavity 94 of the spool 46. The fluid enters the second annular groove 66 of the sleeve 44 through the second orifice 40 of the spool 46. The fluid then passes through the second plurality of control passages 74 and through the second port 32 into the second chamber 28 of the bore 18 of the housing 16. In this example, the second port 32 acts as a fluid outlet for the fluid flow regulator 14.

The axial displacement of the spool 46 in the bore 60 of the sleeve 44 is dependent on a differential pressure $\Delta P$ across the sensing orifice 36 of the spool 46. If the differential pressure $\Delta P$ across the sensing orifice 36 of the spool 46 is below a limit, the spool 46 remains centrally disposed in the bore 60 of the sleeve 44 between the first and second spring assemblies 100, 102. As the differential pressure $\Delta P$ across the sensing orifice 36 increases beyond the limit, the spool 46 is axially displaced in the bore 60 along the central longitudinal axis 62. In one aspect of the present disclosure, the limit is dependent on the spring rate of one of the first and second spring assemblies 100, 102.

If the flow rate of the fluid entering the first cavity 88 of the spool 46 is high, the differential pressure $\Delta P$ across the sensing orifice 36 will be high. This high differential pressure $\Delta P$ translates to a force that acts against the first surface 90 of the inner wall 91 of the spool 46 to displace the valve assembly 42 toward the first position $P_1$ (for illustration purposes, this is shown schematically in FIG. 1 as a pilot line). In one aspect of the present disclosure, the force displaces the spool 46 in a first axial direction toward the second axial end portion 50 of the sleeve 44.

In the subject example, the displacement of the spool 46 in the first axial direction results in a decrease in the first flow area of the first orifice 38. The first flow area of the first orifice 38 is defined by the interface between the opening 87 of the first orifice 38 and the bore 60 of the sleeve 44. The first flow area of the first orifice 38 is decreased by the opening 87 of the first orifice 38 being at least partially covered by the land 71 in the sleeve 44. As the opening 87 of the first orifice 38 and the land 71 of the sleeve 44 cooperatively reduce the first flow area of the first orifice 38 in response to changes in differential pressure ΔP across the sensing orifice 36, the first orifice 38 acts as a pressure compensated variable orifice as fluid flows in the first direction through the fluid flow regulator 14 (i.e., from the first port 30 to the second port 32).

As the spool 46 is displaced in the first axial direction toward the second axial end portion 50 of the sleeve 44, the opening 93 of the second orifice 40 is in unblocked fluid communication with the second annular groove 66 in the bore 60. Therefore, as the opening 93 of the second orifice 40 is in unblocked fluid communication with the second annular groove 66 as the spool 46 is displaced in the first axial direction, the second orifice 40 acts as a fixed orifice as fluid flows in the first direction through the fluid flow regulator 14.

As the piston rod 24 extends from the housing 16, fluid from the second chamber 28 of the bore 18 is communicated to the first chamber 26 in the second direction through the fluid flow regulator 14. In the second direction, fluid enters the fluid flow regulator 14 through the second port 32, which acts as a fluid inlet for the fluid flow regulator 14 in this example. The fluid is communicated into the second annular groove 66 of the sleeve 44 through the second plurality of control passages 74. The fluid then passes through the second orifice 40 of the spool 46 into the second cavity 94. The fluid is communicated through the sensing orifice 36 of the inner wall 91 to the first cavity 88 of the spool 46. The fluid enters the first annular groove 64 of the sleeve 44 through the first orifice 38 of the spool 46. The fluid then passes through the first plurality of control passages 72 and through the first port 30 into the first chamber 26 of the bore 18 of the housing 16. In this example, the first port 30 acts as a fluid outlet for the fluid flow regulator 14.

As the flow rate into the fluid flow regulator 14 increases, the differential pressure across the sensing orifice 36 increases. With the fluid passing through the fluid passage 34 in the second direction, the valve assembly 42 is displaced toward the second position P₂ as the differential pressure across the sensing orifice 36 increases. In one aspect of the present disclosure, the differential pressure translates to a force that acts against the second surface 96 of the inner wall 91 and axially displaces the spool 46 in the second axial direction toward the first axial end portion 48 of the sleeve 44. This axial displacement of the spool 46 in the sleeve 44 results in the second flow area of the second orifice 40 being decreased. The second flow area of the second orifice 40 is defined by the interface between the opening 93 of the second orifice 40 and the bore 60 of the sleeve 44. The second flow area of the second orifice 40 is decreased by the opening 93 of the second orifice 40 being at least partially covered by the land 71 in the sleeve 44. As the opening 93 of the second orifice 40 and the land 71 of the sleeve 44 cooperatively reduce the second flow area of the second orifice 40 in response to changes in differential pressure ΔP across the sensing orifice 36, the second orifice 40 acts as a pressure compensated variable orifice as fluid flows in the second direction through the fluid flow regulator 14.

As the spool 46 is displaced in the second axial direction toward the first axial end portion 48 of the sleeve 44, the opening 87 of the first orifice 38 is in unblocked fluid communication with the first annular groove 64 in the bore 60. Therefore, as the opening 87 of the first orifice 38 is in unblocked fluid communication with the first annular groove 64, the first orifice 38 acts as a fixed orifice as fluid flows in the second direction through the fluid flow regulator 14.

In one aspect of the present disclosure, the "meter-in" arrangement of the fluid flow regulator 14 is adapted to minimize the effects of low fluid temperature on the control of fluid through the fluid flow regulator 14. In one aspect of the present disclosure, low fluid temperature is less than or equal to about 0° F. In another aspect of the present disclosure, low fluid temperature is in the range of about −40° F. to about 0° F. Fluid viscosity is a function of fluid temperature. As fluid temperature decreases, fluid viscosity increases. Fluid viscosity is also a function of fluid pressure. As fluid pressure increases, fluid viscosity increases. This functional relationship between fluid viscosity and fluid pressure is greater at low fluid temperatures than at high fluid temperatures. In other words, at low fluid temperatures, changes in fluid pressure have a greater impact on fluid viscosity than at high fluid temperatures. As fluid viscosity increases, the differential pressure ΔP across an orifice increases for a given flow rate.

In conventional flow regulators, the flow exiting the flow regulator is varied in response to changes in the differential pressure ΔP across an orifice. However, at low fluid temperatures where changes in differential pressure ΔP across the orifice are due to changes in fluid viscosity rather than changes in flow rate, the conventional flow regulators provide inaccurate and/or inconsistent output flows.

In one aspect of the present disclosure, the variable orifice disposed upstream of the sensing orifice 36 decreases the sensitivity of the fluid flow regulator 14 to the effects of low fluid temperatures. As a result of pressure losses across the variable orifice disposed upstream from the sensing orifice 36, the pressure of the fluid in the chamber of the spool 46 that is upstream from the sensing orifice 36 is less than the pressure of the fluid at the inlet to the fluid flow regulator 14. As previously provided, the functional relationship between fluid viscosity and fluid pressure is greater at low fluid temperatures than at high fluid temperatures. Therefore, as the pressure of the fluid in the chamber of the spool 46 is less than the pressure of the fluid at the fluid inlet due to the pressure losses across the variable orifice, the viscosity of the fluid is lower in the chamber of the spool 46 upstream from the sensing orifice 36 than the viscosity of the fluid at the fluid inlet. By reducing the pressure of the fluid in the chamber upstream from the sensing orifice 36, the differential pressure ΔP across the sensing orifice 36 is more a function of flow rate than viscosity. Therefore, with the differential pressure ΔP across the sensing orifice 36 being more a function of flow rate than viscosity, the low temperature effects on the fluid are minimized at the variable orifice upstream from the sensing orifice 36.

Figure 6:
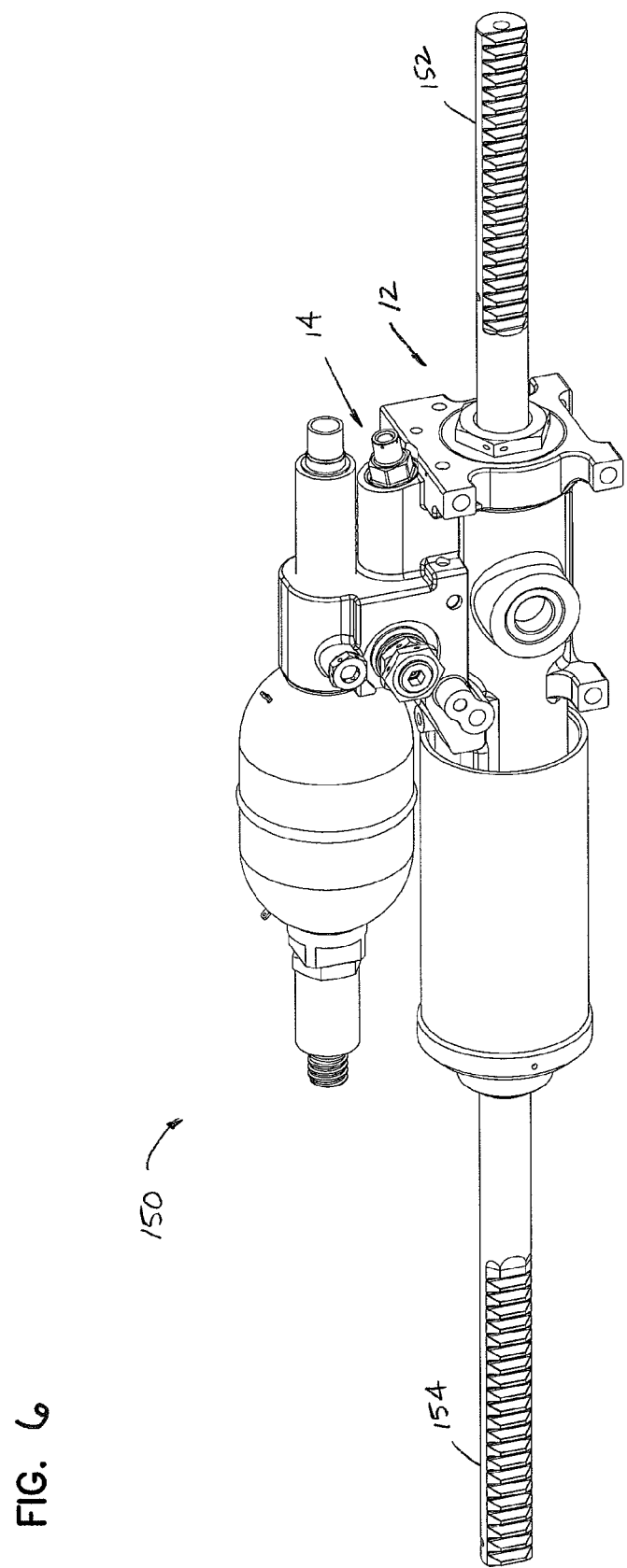
FIG. 6 is a perspective view of a snubber assembly.

Referring now to FIG. 6, a snubber assembly 150 is shown. The snubber assembly 150 is a closed loop system that is adapted for use in various applications. In one aspect of the present disclosure, the snubber assembly 150 is adapted for use with an aircraft passenger access door. The snubber assembly 150 includes the actuator assembly 12 and the fluid flow regulator 14.

In one aspect of the present disclosure, the snubber assembly 150 is mounted to a door of the aircraft. A first end 152 of the piston assembly 20 (shown in FIG. 1) is engaged to the aircraft door while a second end 154 of the piston assembly 20 is engaged to a body of the aircraft. The fluid flow regulator 14 of the snubber assembly 150 is adapted to provide a generally consistent flow rate of fluid through the fluid flow regulator 14 such that the opening and closing speed of the door of the aircraft is generally constant.

As the aircraft is routinely subjected to various climates and high altitudes, the temperature of the fluid in the snubber assembly 150 can vary significantly. In one aspect of the present disclosure, the operating temperature of the fluid in the snubber assembly 150 can range from −40° F. to 160° F. In another aspect of the present disclosure, the operating temperature of the fluid in the snubber assembly 150 is greater than or equal to about −40° F. In one aspect of the present disclosure, the fluid flow regulator 14 provides a generally constant flow output within this operating temperature range by minimizing the temperature effects on the fluid.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fluid flow regulator comprising:
    a valve assembly defining a fluid passage, the fluid passage including:
        a first port
        a second port;
        a sleeve defining a bore and a spool disposed in the bore;
        a sensing orifice disposed in the fluid passage between the first and second ports;
        a first variable orifice defined by a first annular groove in the sleeve and a first orifice in the spool, the first variable orifice being disposed in the fluid passage between the first port and the sensing orifice, wherein a first flow area of the first variable orifice varies in response to differential pressure across the sensing orifice as fluid flows through the fluid passage in a first direction from the first port to the second port and is fixed as fluid flows through the fluid passage in a second direction from the second port to the first port;
        a second variable orifice defined by a second annular groove in the sleeve and a second orifice in the spool, the second variable orifice being disposed in the fluid passage between the sensing orifice and the second port, wherein a second flow area of the second variable orifice is fixed as fluid flows through the fluid passage in the first direction and varies in response to differential pressure across the sensing orifice as fluid flows through the fluid passage in the second direction.

2. The fluid flow regulator of claim 1, wherein the valve assembly includes a first bypass orifice disposed in parallel with the first orifice.

3. The fluid flow regulator of claim 2, wherein the valve assembly includes a second bypass orifice disposed in parallel with the second orifice.

4. The fluid flow regulator of claim 1, wherein the spool is adapted to slide in the bore of the sleeve.

5. The fluid flow regulator of claim 1, wherein the bore of the sleeve includes a land disposed between the first and second annular grooves.

6. A fluid flow regulator comprising:
    a valve assembly including:
        a sleeve defining a bore, the sleeve further defining a fluid inlet and a fluid outlet disposed downstream of the fluid inlet, the fluid inlet and the fluid outlet being in fluid communication with the bore, the sleeve defining a first annular groove disposed in the bore;
        a spool disposed in the bore of the sleeve, the spool defining a first orifice and a sensing orifice disposed downstream of the fluid inlet;
        the first orifice of the spool and the first annular groove of the sleeve cooperatively defining a variable orifice disposed upstream of the sensing orifice and downstream of the fluid inlet, wherein a flow area of the variable orifice decreases as differential fluid pressure across the sensing orifice increases beyond a limit;
    wherein the valve assembly is adapted to allow fluid to flow in a first direction and an opposite second direction.

7. The fluid flow regulator of claim 6, wherein the spool defines a fixed orifice disposed downstream of the sensing orifice and upstream of the fluid outlet.

8. The fluid flow regulator of claim 6, wherein the spool defines a first bypass orifice disposed in parallel with the variable orifice.

9. The fluid flow regulator of claim 6, wherein the spool and the sleeve cooperatively define a fixed orifice disposed downstream of the sensing orifice and upstream of the fluid outlet.

10. A snubber assembly comprising:
    an actuator assembly having:
        a housing defining a bore;
        a piston assembly disposed in the bore, the piston assembly and the bore cooperatively defining a first chamber of the bore and a second chamber of the bore;
    a fluid flow regulator in fluid communication with the actuator assembly, the fluid flow regulator defining a fluid passage including:
        a fluid inlet;
        a fluid outlet downstream of the fluid inlet;
        a sensing orifice disposed in the fluid passage between the fluid inlet and the fluid outlet; and
        a variable orifice disposed upstream of the sensing orifice in the fluid passage, the variable orifice being defined by an annular groove in a sleeve and by an orifice in a spool disposed within a bore of the sleeve, wherein a differential fluid pressure across the sensing orifice affects a flow area of the variable orifice;
    wherein the fluid flow regulator is adapted to provide bidirectional fluid flow through the fluid passage.

11. The snubber assembly of claim 10, wherein the fluid flow regulator includes a fixed orifice disposed downstream of the sensing orifice and upstream from the fluid outlet.

12. The snubber assembly of claim 11, wherein the fluid flow regulator includes a first bypass orifice disposed in parallel with the variable orifice.

13. The snubber assembly of claim 12, wherein the fluid flow regulator includes a second bypass orifice disposed in parallel with the fixed orifice.

14. The snubber assembly of claim 10, wherein the fluid flow regulator includes a sleeve defining a bore and a spool disposed in the bore.

15. The snubber assembly of claim 14, wherein the spool is adapted to slide in the bore of the sleeve.

* * * * *